United States Patent
Pawar et al.

(10) Patent No.: US 8,477,735 B1
(45) Date of Patent: Jul. 2, 2013

(54) SYSTEM AND METHOD FOR ACCESS TERMINAL TRANSITION BETWEEN A MIMO REVERSE-LINK MODE AND A NON-MIMO REVERSE-LINK MODE

(75) Inventors: Hemanth Balaji Pawar, Herndon, VA (US); Shilpa Kowdley, Herndon, VA (US); Badri P. Subramanyan, Overland Park, KS (US); Piyush Upadhyay, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 507 days.

(21) Appl. No.: 12/432,819

(22) Filed: Apr. 30, 2009

(51) Int. Cl.
  *H04W 4/00* (2009.01)
(52) U.S. Cl.
  USPC .......................................................... 370/332
(58) Field of Classification Search
  USPC .................................. 370/276, 332, 333, 334
  See application file for complete search history.

(56) References Cited

U.S. PATENT DOCUMENTS

| | | | |
|---|---|---|---|
| 6,934,320 B2 * | 8/2005 | Tujkovic et al. | 375/146 |
| 7,184,743 B2 * | 2/2007 | Walton et al. | 455/343.4 |
| 7,403,800 B2 | 7/2008 | Han et al. | |
| 7,574,236 B1 * | 8/2009 | Mansour | 455/562.1 |
| 7,636,573 B2 * | 12/2009 | Walton et al. | 455/454 |
| 7,782,899 B2 * | 8/2010 | Chen et al. | 370/468 |
| 2005/0281228 A1 | 12/2005 | Oh et al. | |
| 2005/0288062 A1 * | 12/2005 | Hammerschmidt et al. | 455/562.1 |
| 2006/0029096 A1 * | 2/2006 | Babbar et al. | 370/466 |
| 2006/0121946 A1 * | 6/2006 | Walton et al. | 455/561 |
| 2007/0030116 A1 | 2/2007 | Feher | |
| 2007/0201536 A1 | 8/2007 | Nicolas et al. | |
| 2008/0049706 A1 | 2/2008 | Khandekar et al. | |
| 2008/0095263 A1 * | 4/2008 | Xu et al. | 375/295 |
| 2008/0106476 A1 | 5/2008 | Tran et al. | |
| 2008/0200203 A1 | 8/2008 | Malladi et al. | |
| 2009/0009421 A1 | 1/2009 | Suprunov et al. | |

FOREIGN PATENT DOCUMENTS

WO   WO 2005/088875 A1   9/2005

OTHER PUBLICATIONS

U.S. Appl. No. 12/035,783, filed Feb. 22, 2008 and entitled "Method and system for extending multiple input multiple output wireless service."

Javvin Network Management & Security, SIMO: Single Input Multiple Output, downloaded from the world wide web at http://www.javvin.com/wireless/SIMO.html on Apr. 9, 2009.

(Continued)

*Primary Examiner* — Mark Rinehart
*Assistant Examiner* — Mohammad Anwar

(57) ABSTRACT

A method and access terminal (AT) are provided for switching operation of the access terminal between a multiple-input multiple-output (MIMO) reverse-link mode and a non-MIMO reverse-link mode. The AT receives reverse activity bits (RABs) from one or more radio nodes via one or more forward-link channels. The AT determines a reverse-activity-indicator from the RABs and determines whether the reverse-activity-indicator indicates that reverse activity on a reverse-link being monitored by the AT or being used by the AT to carry out reverse-link communications exceeds a threshold level of activity. If the reverse-activity-indicator indicates that reverse activity exceeds the threshold level of activity, then the AT transitions to or continues operating in a MIMO reverse-link mode, otherwise, if the reverse-activity-indicator indicates that reverse activity does not exceed the threshold level of activity, then the AT transitions to or continues operating in a non-MIMO reverse-link mode.

20 Claims, 6 Drawing Sheets

OTHER PUBLICATIONS

MIMO, downloaded from the world wide web at http://en/wikipedia.org/wiki/Multiple-input_multiple-output on Mar. 13, 2009.

Evolution-Data Optimized, downloaded from the world wide web at http://en/wikipedia.org/wiki/Evolution-Data_Optimized on Feb. 2, 2009.

Airvana, IP-RN Series, downloaded from the world wide web at http://www.airvana.com/products/products_iprn_series.html on Mar. 17, 2009.

Leung, Michael Dr., Understanding Advanced 3G MIMO Technologies, downloaded from the world wide web at http://www.wirelessdesignasia.com/print.asp?id=10220 on Apr. 9, 2009.

CDMA 2000 Network Architecture, downloaded from the world wide web at http://www.networkdictionary.com/files/CDMA.gif on Mar. 17, 2009.

What is MIMO?—Definition from Whatis.com, Nov. 6, 2006, downloaded from the world wide web at http://searchmobilecomputing.techtarget.com/sDefinition/0,,sid40_gci1025328,00.html.

StarMAX Family, Best-in-Class Solutions for Mobile WiMAX and Fixed WiMAX BWA, Mar. 28, 2008.

* cited by examiner

Single Input Multiple Output (SIMO)

Multiple Input Multiple Output – A (MIMO-A)

Multiple Input Multiple Output – B (MIMO-B)

SYSTEM AND METHOD FOR ACCESS TERMINAL TRANSITION BETWEEN A MIMO REVERSE-LINK MODE AND A NON-MIMO REVERSE-LINK MODE

BACKGROUND

Wireless communications may be carried out via a wireless communication system including one or more access terminals (e.g., one or more cellular phones) and one or more radio access networks. Wireless communication systems may be configured for multiple-input multiple-output (MIMO) communications. MIMO systems may improve wireless communications by providing signal diversity and/or channel diversity. MIMO signals that enhance signal diversity are particularly useful in cellular wireless communication systems, where the landscape often makes line of sight transmission impractical.

In cellular networks, MIMO signals can be encoded using space-time coding, which is sometimes referred to as diversity coding or Alamouti coding, to improve signal diversity. To transmit a signal encoded using space-time coding, a transmitting device transmits the same signal stream from multiple antennas. Further, the signal streams may be orthogonally coded in relation to each other. A receiving device with multiple antennas (preferably corresponding to in number to the antennas of the transmitting device) may then receive the signal from multiple streams transmitted from the multiple antennas of the transmitting device. Such a configuration may result in signal gain at the receiving device.

MIMO systems may also use spatial multiplexing to increase channel capacity. To use spatial multiplexing, a high data rate signal may be divided into multiple signal streams. Each of these unique streams may then be transmitted on the same radio frequency (RF) frequency from multiple antennas of a transmitting device and received by multiple antennas of a receiving device. Spatial multiplexing may be particularly helpful in communication channels with higher signal-to-noise (SNR) ratios to enable higher throughput than would be possible without this MIMO technique.

OVERVIEW

A given access terminal may maintain or improve a quality of wireless communications carried out by the given access terminal if the given access terminal can switch its operation between a multiple-input multiple-output (MIMO) reverse-link mode and a non-MIMO reverse-link mode.

In one respect, an exemplary embodiment may take the form of a method carried out at an access terminal operable in a MIMO reverse-link mode and in a non-MIMO reverse-link mode. The method comprises (i) while the access terminal is operating in the non-MIMO reverse-link mode, the access terminal determining a first reverse-link-activity indicator pertaining to a first reverse-link, and determining whether the first reverse-link-activity indicator indicates that activity on the first reverse-link exceeds a threshold level of activity, (ii) if the access terminal determines that the first reverse-link-activity indicator indicates that the activity on the first reverse-link does not exceed the threshold level of activity, then the access terminal continues to operate in the non-MIMO reverse-link mode, and (iii) if the access terminal determines that the first reverse-link-activity indicator indicates that the activity on the first reverse-link exceeds the threshold level of activity, then the access terminal transitions to operate in the MIMO reverse-link mode instead of the non-MIMO reverse-link mode.

In another respect, an exemplary embodiment may be carried out by an access terminal that is operable in a MIMO reverse-link mode and in a non-MIMO reverse-link mode. The access terminal comprises a processor, and a data storage device that contains first computer-readable program instructions and second computer-readable program instructions that are executable by the processor. Execution of the first program instructions causes the processor to determine reverse-link-activity indicators pertaining to a first reverse-link, and to determine whether the reverse-link-activity indicators indicate that activity on the first reverse-link exceeds a threshold level of activity. While the access terminal operates in the non-MIMO mode, if the processor executes the first program instructions and determines that a first reverse-link-activity indicator indicates that activity on the first reverse-link does not exceed a threshold level of activity, then the access terminal continues to operate in the non-MIMO reverse-link mode. While the access terminal operates in the non-MIMO mode, if the processor executes the first program instructions and determines that the first reverse-link-activity indicator indicates that the activity on the first reverse-link exceeds the threshold level of activity, then the processor executes the second program instructions. Execution of the second program instructions causes the access terminal to transition from the non-MIMO reverse-link mode to the MIMO reverse-link mode.

In yet another respect, an exemplary embodiment may take the form of another method carried out at an access terminal operable in a MIMO reverse-link mode and in a non-MIMO reverse-link mode. The method comprises (i) while the access terminal is operating in the non-MIMO reverse-link mode via a first reverse-link, the access terminal determining a reverse-link-activity indicator pertaining to a second reverse-link, and determining whether the reverse-link-activity indicator pertaining to the second reverse-link indicates that activity on the second reverse-link exceeds a threshold level of activity, (ii) if the access terminal determines that the reverse-link-activity indicator pertaining to the second reverse-link indicates that the activity on the second reverse-link does not exceed the threshold level of activity, then the access terminal continues to operate in the non-MIMO reverse-link mode on the first reverse-link, and (iii) if the access terminal determines that the reverse-link-activity indicator pertaining to the second reverse-link indicates that the activity on the second reverse-link exceeds the threshold level of activity, then the access terminal transitions to operate in the MIMO reverse-link mode on the first reverse-link instead of the non-MIMO reverse-link mode on the first reverse-link.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

In accordance with an exemplary embodiment, an access terminal operable in a wireless communication system switches its operation between a multiple-input multiple-output (MIMO) reverse-link mode and a non-MIMO reverse-link mode. The access terminal may make a determination when to switch between the MIMO reverse-link mode and the non-MIMO reverse-link mode based on an activity level on the reverse-link the access terminal is monitoring or communicating on. The access terminal may determine the activity level based on reverse activity bits that the access terminal receives from a radio node via a forward-link channel.

In a MIMO reverse-link mode, a transmitter of the access terminal transmits reverse-link signals via multiple antennas (e.g., two antennas), and a receiver at a radio node receives the reverse-link signals via multiple antennas (e.g., two antennas) at the radio node. In a non-MIMO reverse-link mode, such as a single-input-multiple-output (SIMO) reverse-link mode, a transmitter of the access terminal transmits reverse-link signals via only one of the access terminal's multiple antennas, and a receiver at the radio node receives the reverse-link signals via multiple antennas (e.g., two antennas) at the radio node.

Figure 1:
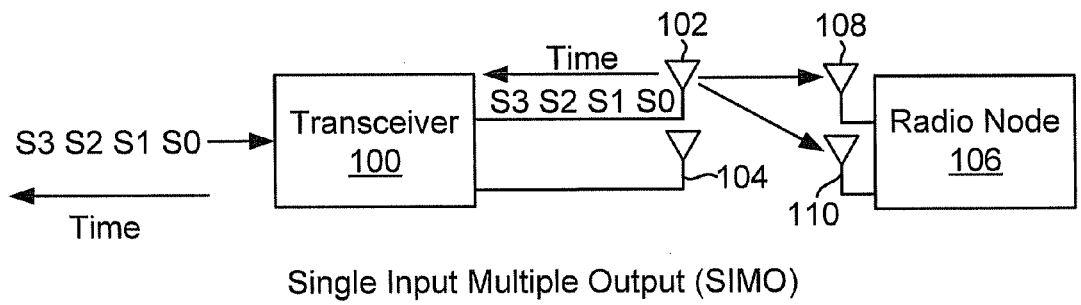
FIG. 1 is a diagram illustrating a transceiver operating in a non-MIMO reverse-link mode.
Figure 4:
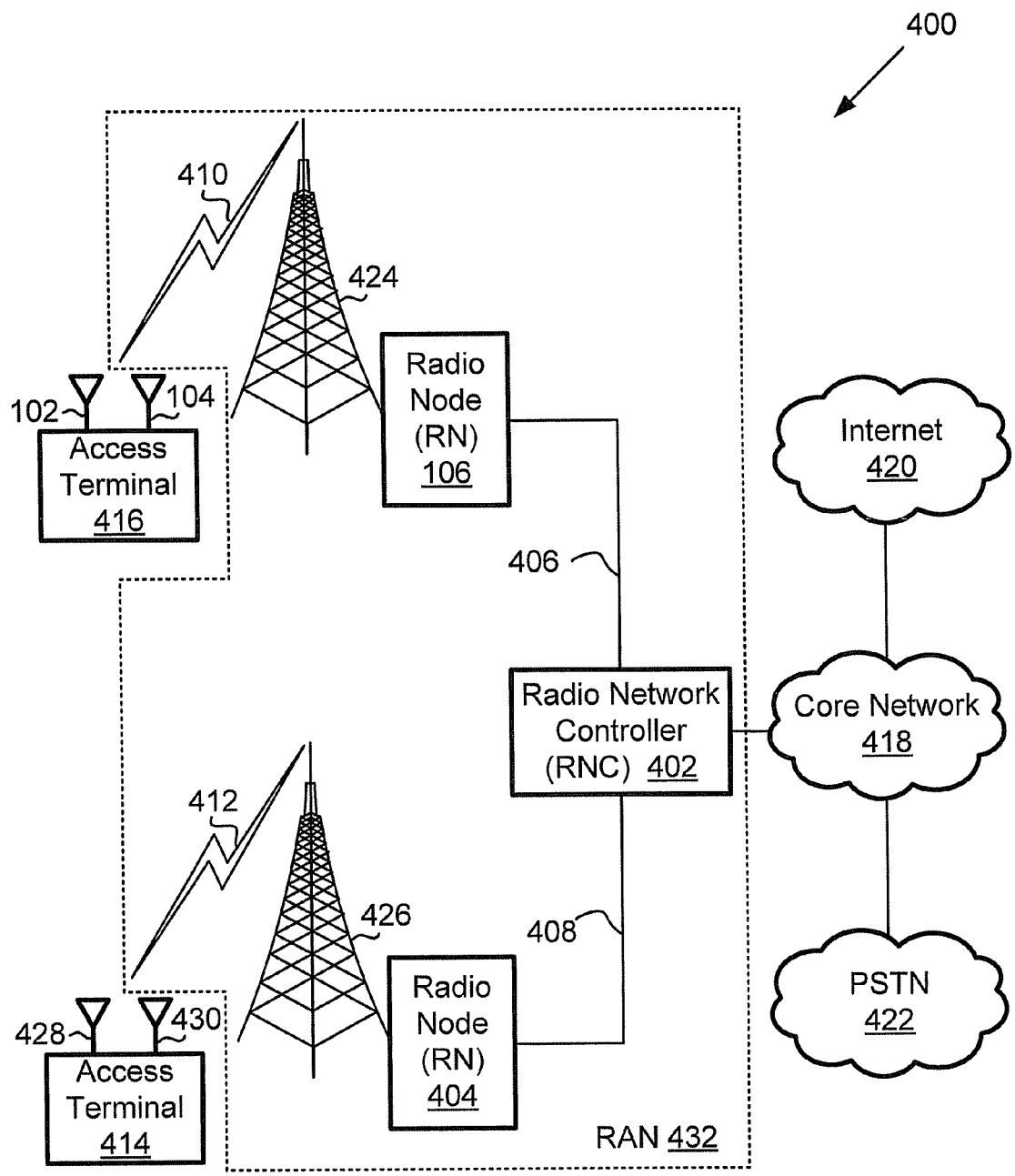
FIG. 4 is a diagram illustrating a communication system in which an exemplary embodiment may be carried out.
Figure 6:
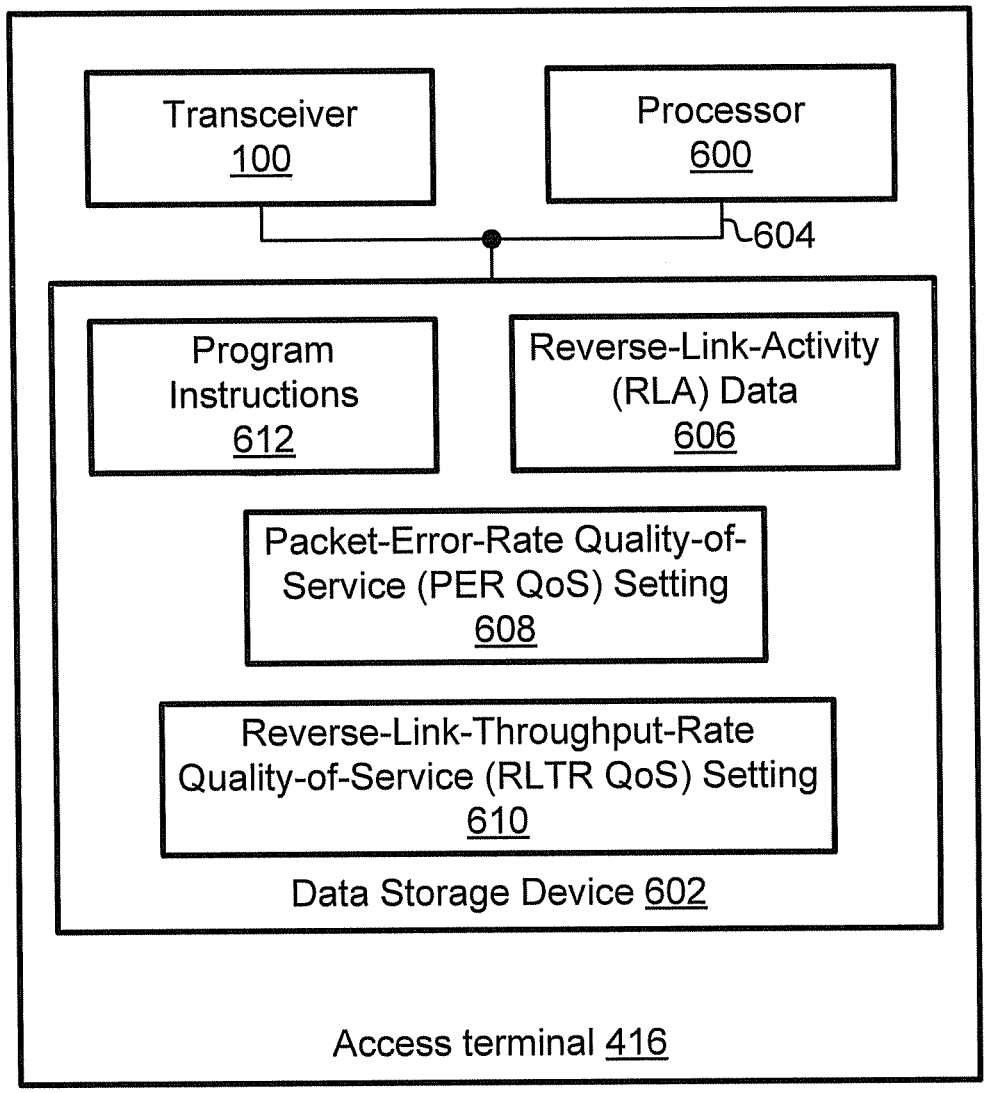
FIG. 6 is a block diagram of an access terminal operable within the communication system illustrated in FIG. 4.

FIG. 1 illustrates an access terminal transceiver 100 that is connected to antennas 102, 104, and a radio node 106 that is connected to antennas 108, 110. Transceiver 100 may be located in an access terminal 416 that is illustrated in FIGS. 4 and 6. As illustrated in FIG. 1, transceiver 100 is operating in a non-MIMO reverse-link mode, namely a single-input-multiple-output (SIMO) reverse-link mode. In this regard, an input data stream including symbols S0, S1, S2, and S3, generated at access terminal 416, is transmitted via antenna 102. The symbols of the input data stream may be or represent data for a voice call being carried out by a user of access terminal 416, data to request downloading of a media file (e.g., an image or a recorded song) to access terminal 416, or some other data.

Figure 2:
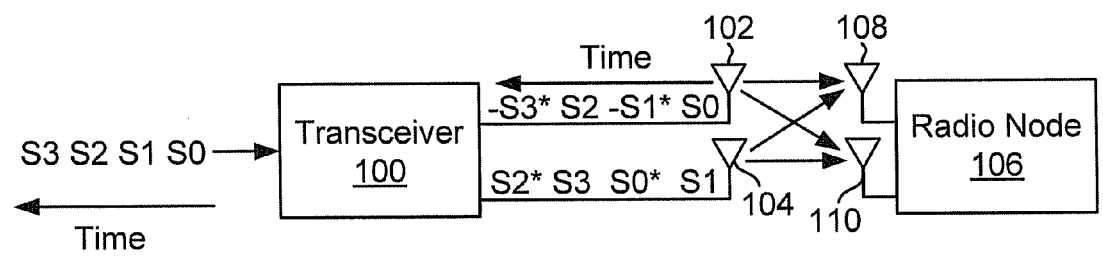
FIG. 2 is a diagram illustrating a transceiver operating in a MIMO reverse-link mode.

Next, FIG. 2 illustrates transceiver 100 operating in a MIMO reverse-link mode in which transceiver 100, or another element of access terminal 416 (e.g., a processor 600), uses space-time coding to encode the input data stream. As an example, for the data stream including symbols S0, S1, S2, and S3, during a first transmit period, transceiver 100 may transmit symbol S0 via antenna 102 and symbol S1 via antenna 104. During a second transmit period occurring after the first transmit period, transceiver 100 may transmit the negative complex conjugate of symbol S1 (shown as −S1* in FIG. 2) via antenna 102, and the complex conjugate of symbol S0 (shown as S0* in FIG. 2) via antenna 104. During a third transmit period occurring after the second transmit period, transceiver 100 may transmit symbol S2 via antenna 102 and symbol S3 via antenna 104. During a fourth transmit period occurring after the third transmit period, transceiver 100 may transmit the negative complex conjugate of symbol S3 (shown as −S3* in FIG. 2) via antenna 102, and the complex conjugate of symbol S2 (shown as S2* in FIG. 2) via antenna 104.

For purposes of this description, the MIMO mode illustrated in FIG. 2 is referred to as MIMO-A. MIMO-A may be used to reduce packet error rates at a radio node receiving the signals transmitted via transceiver 100.

Figure 3:
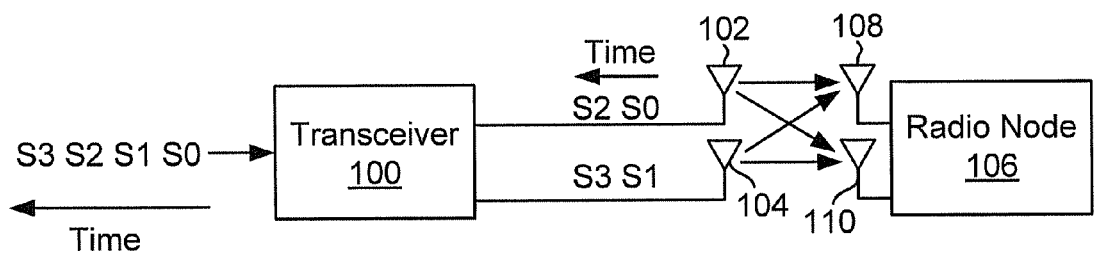
FIG. 3 is another diagram illustrating a transceiver operating in a MIMO reverse-link mode.

Next, FIG. 3 illustrates transceiver 100 operating in a MIMO reverse-link mode in which transceiver 100, or another element of access terminal 416 (e.g., processor 600), divides the input data stream into a respective data stream for each transmitting antenna of access terminal 416. As an example, transceiver 100 or processor 600 may divide the data stream including symbols S0, S1, S2, and S3 into a first divided stream including symbols S0 and S2, and a second divided stream including symbols S1 and S3. In this regard, transceiver 100, or transceiver 100 and processor 600, carry out spatial multiplexing to increase channel capacity. Transceiver 100 may transmit the first divided stream via antenna 102 and the second divided stream via antenna 104. For purposes of this description, the MIMO mode illustrated in FIG. 3 is referred to as MIMO-B.

2. Exemplary Communication System

FIG. 4 is a block diagram of a communication system 400 in accordance with an exemplary embodiment. It should be understood that the arrangement of communication system 400 and other arrangements illustrated herein, described herein, or illustrated and described herein are set forth only as examples. Those skilled in the art will appreciate that other arrangements and elements (e.g., machines, interfaces, functions, orders, and groupings of functions, etc.) can be used instead, and that some elements may be omitted altogether. Many of the elements described herein are functional entities that may be implemented as discrete or distributed components or in conjunction with other components, and in any suitable combination and location. Various functions described herein as being performed by one or more elements may be carried out by hardware, firmware, software (e.g., computer-readable program instructions that are stored at a data storage device and executable by a processor), or some combination of hardware, firmware, and software. For purposes of this description, the word "exemplary" is used to mean "serving as an example, instance, or illustration." Any embodiment or element described herein as "exemplary" is not necessarily to be construed as preferred or advantageous over other embodiments or elements.

As illustrated in FIG. 4, communication system 400 includes a radio network controller (RNC) 402, radio nodes (RNs) 106, 404, RNC-to-RN interfaces 406, 408, air interfaces 410, 412, access terminals 414, 416, a core network 418, the Internet 420, and a public switched telephone network (PSTN) 422. Access terminal 416 includes antennas 102, 104. Access terminal 414 includes antennas 428, 430. Communication system 400 may include a radio access network (RAN) 432 that includes RNC 402, RN 106, RN 404, RNC-to-RN interfaces 406, 408, and air interfaces 410, 412.

Radio nodes 106, 404 each provide one or more coverage areas, such as cells and sectors (i.e., individual areas of a cell that allow the cell to carry more calls). Radio nodes 106, 404 each include (i) one or more radio transmitters for wirelessly transmitting radio frequency (RF) signals that form the one or more coverage areas, and (ii) one or more radio receivers for wirelessly receiving RF signals transmitted from access terminals, such as access terminals 414, 416. The transmitter(s) and receiver(s) of radio node 106 may each include one or more antennas, and these antennas may be located on a cell-site tower 424. Similarly, the transmitter(s) and receiver(s) of radio node 404 may each include one or more antennas, and these antennas may be located on a cell site tower 426. A person having ordinary skill in the art will understand that the transmitter(s) and receiver(s) of a given radio node may configured as one or more transceivers.

Figure 5:
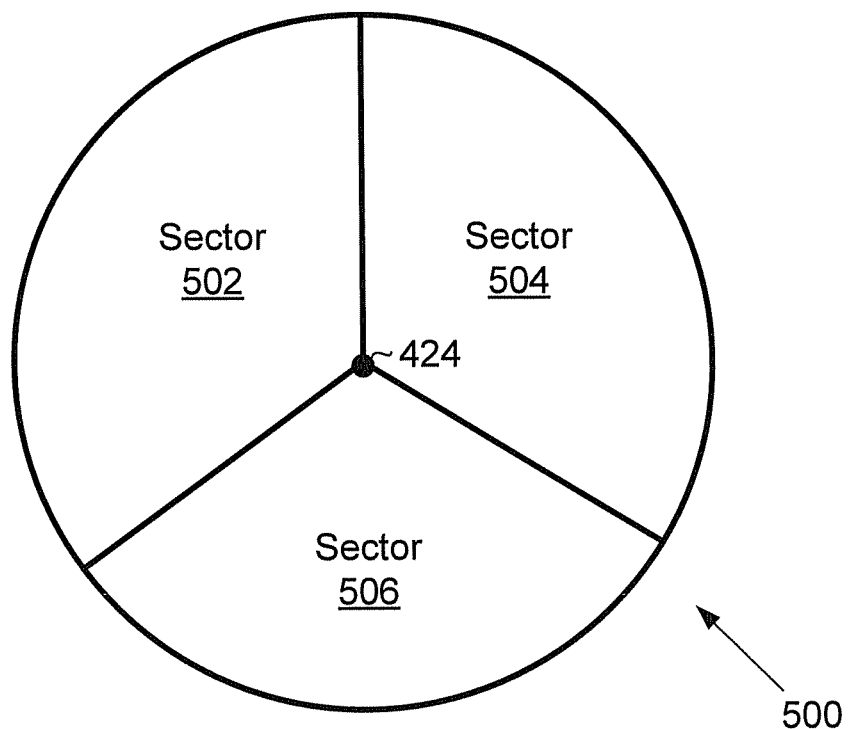
FIG. 5 is a diagram that illustrates a cell formed by the communication system illustrated in FIG. 4.

Next, FIG. 5 illustrates a cell 500 formed by antennas located on cell-site tower 424. As illustrated in FIG. 5, cell 500 includes three coverage areas defined by sector 502, sector 504, and sector 506. A cell foamed by antennas located on cell-tower 426 may be configured in an arrangement similar to cell 500, or in another arrangement. A person having ordinary skill in the art will understand that a given cell formed by antennas located on cell-site tower 424 may take a shape other than a circle.

Returning to FIG. 4, air interface 410 is a wireless communication link between radio node 106 and one or more access terminals (e.g., access terminal 416) located within the coverage area formed by radio node 106. Air interface 410 carries forward-link communications from radio node 106 to the access terminal(s) located within the coverage area formed by radio node 106. Air interface 410 also carries reverse-link communications, from the access terminal(s) located within the coverage area formed by radio node 106, to radio node 106. As an example, these reverse-link communications may include communications transmitted via antenna 102, antenna 104, or both antennas 102, 104. Air interface 410 may form a sector of cell 500, such as sector 502.

Air interface 412 is a wireless communication link between radio node 404 and one or more access terminals (e.g., access terminals 414, 416) located within the coverage area formed by radio node 404. Air interface 412 carries forward-link communications from radio node 404 to the access terminal(s) located within the coverage area formed by radio node 404. Air interface 412 also carries reverse-link communications, from the access terminal(s) located within the coverage area formed by radio node 404, to radio node 404. As an example, these reverse-link communications may include communications transmitted via antenna 428, antenna 430, or both antennas 428, 430. A portion of the coverage areas formed by radio nodes 106, 404 may overlap.

RNC 402 is operable to control radio nodes 106, 404, and to provide access terminals 414, 416 with access to various networks such as core network 418, the Internet 420, and PSTN 422. Core network 418 may be operated by a wireless service provide that operates RAN 432 so as to provide wireless service to access terminals 414, 416. The Internet 420 includes a set of computer networks that carry out communications using an Internet Protocol. The PSTN 422 includes one or more landline telephones that may be used during voice calls with access terminals 414, 416.

Next, FIG. 6 is a block diagram that illustrates additional details of access terminal 416. As illustrated in FIG. 6, access terminal 416 includes transceiver 100, a processor 600, and a data storage device 602, all of which may be linked together via a system bus, network, or other connection mechanism 604. Access terminal 414, as well as one or more other access terminals that are operable in communication system 400, may be arranged as access terminal 416.

Transceiver 100 is operable to transmit and receive RF communications over one or more air interfaces (e.g., air interfaces 410, 412). Transceiver 100 may include or connect to two or more antennas (e.g., antennas 102, 104). Preferably, each of the two or more antennas is operable to transmit reverse-link communications and receive forward-link communications. Alternatively, the two or more antennas may include (i) two or more antennas that transmit reverse-link communications but do not receive forward-link communications, and (ii) two or more antennas that receive forward-link communications but do not transmit reverse-link communications.

Transceiver 100 may include or connect to one or more switches that, depending on a position of the one or more switches, causes transceiver 100, as well as access terminal 416, to operate in either a MIMO reverse-link mode (e.g., MIMO-A or MIMO-B) or a non-MIMO reverse-link mode (e.g., a SIMO reverse-link mode).

Processor 600 may comprise one or more general purpose processors (e.g., INTEL microprocessors), one or more special purpose processors (e.g., digital signal processors), or one or more general purpose processors and one or more special purpose processors. Processor 600 may execute computer-readable program instructions stored at data storage device 602.

Data storage device 602 comprises a computer-readable storage medium readable by processor 600. The computer-readable storage medium may comprise volatile and/or non-volatile storage components, such as optical, magnetic, organic or other memory or disc storage, which can be integrated in whole or in part with processor 600.

Data storage device 602 contains various data. As an example, data storage device 602 may contain reverse-link-activity (RLA) data 606. RLA data 606 may comprise various data. For instance, RLA data 606 may comprise reverse activity bit (RAB) data representing reverse activity bits that access terminal 416 receives from radio node 106 via a forward-link channel of air interface 410.

Access terminal 416 and a radio node may carry out communications in accordance with an air interface protocol known as Evolution Data Optimized (EV-DO) or 1xEV-DO, perhaps in conformance with one or more industry specifications such as IS-856, Release 0 and IS-856, Revision A. In such an embodiment, each 26.67 millisecond (ms) frame transmitted by the radio node may include 16 slots, each slot may include one or more media access channels, and each slot may include 1 RAB within a given media access channel (MAC) within the slot. According to the 1xEV-DO protocol, a given sector sets a RAB to 1 if the sector determines that reverse-link activity is high, otherwise, the sector sets the RAB to 0.

Table 1 depicts an example of RLA data 606 in which RLA data 606 includes RAB data representing reverse activity bits that access terminal 416 receives from sector 502 and sector 506. The RAB data depicted in Table 1 is arranged from the left side (earliest stored RAB) to the right side (most recently stored RAB).

TABLE 1

| Reverse-link activity data | | | | | | | |
|---|---|---|---|---|---|---|---|
| Time | T1 | T2 | T3 | T4 | T5 | T6 | T7 |
| RAB Data - Sector 502 | 0 | 0 | 0 | 0 | 1 | 0 | 1 |
| RAB Data - Sector 506 | 1 | 0 | 0 | 1 | 1 | 0 | 1 |
| Reverse-Link-Activity-Indicator | — | — | — | 0 | 0 | 0 | 1 |
| Time | T1 | T2 | T3 | T4 | T5 | T6 | T7 |

RLA data 606 may comprise a reverse-link-activity indicator that is determined by processor 600. In accordance with an exemplary embodiment, a reverse-link-activity indicator set to 1 indicates that the activity on a reverse-link (e.g., a reverse-link of sector 502 (e.g., air interface 410) is greater than a threshold level of activity, whereas a reverse-link-activity indicator set to 0 indicates that the activity on the reverse-link is not greater than the threshold level of activity.

A reverse-link-activity indicator may be based on one or more reverse activity bits from one or more sectors. In this regard, a reverse-link-activity indicator set to 1 may indicate that the activity on at least one of a plurality of reverse-links (e.g., a reverse-link of sector 502 (e.g., air interface 410) and a reverse-link of sector 506) is greater than a threshold level of activity, whereas a reverse-link-activity indicator set to 0 indicates that the activity on the plurality of reverse-links is not greater than the threshold level of activity.

As another example, data storage device 602 may contain a packet-error-rate quality-of-service (PER QoS) setting 608 and a reverse-link-throughput-rate QoS (RLTR QoS) setting 610. The settings 608, 610 may be modified by a wireless service provider to match a given service level agreement (SLA) that is established between the wireless service provider and a user of access terminal 416.

Table 2 depicts additional RLA data 606 for an embodiment in which PER QoS 608 and RLTR QoS 610 are represented by respective data bits. As shown in Table 2, if the SLA between the wireless service provider and the user of access terminal 416 calls for a low reverse-link packet error rate (PER), then PER QoS 608 is set to 1 and RLTR QoS 610 is set to 0. For the low reverse-link PER SLA, access terminal 416 uses MIMO-A when operating in a reverse-link MIMO mode. On the other hand, if the SLA between the wireless service provider and the user of access terminal 416 calls for high reverse-link throughput, then PER QoS 608 is set to 0 and RLTR QoS 610 is set to 1. For the high reverse-link throughput SLA, access terminal 416 uses MIMO-B when operating in a reverse-link MIMO mode.

TABLE 2

Reverse-link activity data

| Service Level Agreement (SLA) | PER QoS (608) | RLTR QoS (610) | Reverse-link MIMO Mode |
|---|---|---|---|
| Low Reverse-link PER | 1 | 0 | MIMO-A |
| High Reverse-link throughput | 0 | 1 | MIMO-B |

In accordance with an embodiment in which the RLA data of Table 2 is used, PER QoS 608 and RLTR QoS 610 may both be set to either 0 or 1 to indicate that the SLA does not call for a low reverse-link PER or a high reverse-link throughput to have priority over the other. In accordance with another embodiment, a single data bit may be set to 0 or 1 to represent that a PER QoS has a higher priority than a RLTR QoS, and set to the other value to represent that the PER QoS has a lower priority than the RLTR QoS.

As yet another example, data storage device 602 may contain computer-readable program instructions 612 that are executable by processor 600. In particular, program instructions 612 may include program instructions that are executable by processor 600 to determine reverse-link-activity indicators (e.g., the reverse-link-activity indicators in Table 1), and to determine whether any of the reverse-link-activity indicators indicate that activity on a reverse-link exceeds a threshold level of activity. For purposes of this description, these program instructions are referred to as the first program instructions. Processor 600 may execute the first program instructions while access terminal 416 is operating in a MIMO reverse-link mode or in a non-MIMO reverse-link mode.

Execution of the first program instructions may cause processor 600 to perform various functions. For example, execution of the first program instructions may cause processor 600 to determine a reverse-link-activity indicator based on an average of multiple reverse activity bits (RABs) (e.g., 4 RABs) received at access terminal 416 from a given sector (e.g., sector 502). In accordance with this example, as shown in Table 1, no reverse-link-activity indicator is shown for times T1, T2, and T3 because the access terminal 416 has only received 3 RABs. At time T4, the average of the 4 most-recently received RABs from sector 502 is 0, and thus the reverse-link-activity indicator at time T4 is 0. At times T5 and T6, the average of the 4 most-recently received RABs from sector 502 is 0.25, which can be rounded to 0.0, and thus the reverse-link-activity indicators at times T5 and T6 are 0. At time T7, the average of the 4 most-recently received RABs from sector 502 is 0.5, which can be rounded to 1.0, and thus the reverse-link-activity indicator at time T7 is 1.

As another example, execution of the first program instructions may cause processor 600 to determine that a reverse-link-activity indicator indicates that activity on a reverse-link exceeds a threshold level of activity if the reverse-link-activity indicator is 1, or to determine that the reverse-link-activity indicator indicates that activity on the reverse-link does not exceed the threshold level of activity if the reverse-link-activity indicator is 0. In this regard, the threshold level of activity may be represented by a number such as 0.5, and processor 600 compares the reverse-link-activity indicator to this number so as to determine whether the threshold level of activity is exceeded.

Program instructions 612 may include program instructions that are executable by processor 600 to cause access terminal 416 to transition from operating in a non-MIMO reverse-link mode to a MIMO reverse-link mode. For purposes of this description, these program instructions are referred to as the second program instructions. While operating in the non-MIMO mode, transceiver 100 may be coupled to antenna 102 such that transceiver 100 can provide reverse-link communications to antenna 102 for transmission, in turn, to cell-site tower 424. While operating in the non-MIMO mode, transceiver 100 may not be coupled to antenna 104, such that transceiver 100 cannot provide reverse-link communications to antenna 104. Transitioning operation from a non-MIMO reverse-link mode to a MIMO reverse-link mode may include coupling (e.g., by closing a switch) transceiver 100 to antenna 104 so that transceiver 100 can thereafter provide reverse-link communications to antenna 104.

Program instructions 612 may include program instructions that are executable by processor 600 to cause access terminal 416 to transition from operating in a MIMO reverse-link mode to a non-MIMO reverse-link mode. For purposes of this description, these program instructions are referred to as the third program instructions. Execution of the third program instructions may cause a coupling (e.g., a switch) between transceiver 100 and antenna 104 to be opened. Transceiver 100 may remain coupled to antenna 102 during and after the transition to the non-MIMO reverse-link mode.

Processor 600 may execute the third program instructions while access terminal 416 operates in a MIMO reverse-link mode and in response to processor 600 executing the first program instructions to determine that a reverse-link-activity indicator indicates that activity on a reverse-link of air interface 410 does not exceed a threshold level of activity.

Program instructions 612 may include program instructions that are executable by processor 600 to cause access terminal 416 to operate in a MIMO reverse-link mode (e.g., MIMO-A or MIMO-B). For purposes of this description, these program instructions are referred to as the fourth program instructions. Processor 600 may execute the fourth program instructions while access terminal 416 operates in a MIMO reverse-link mode and in response to processor 600 executing the first program instructions to determine that a reverse-link-activity indicator does not exceed the threshold level of activity. Processor 600 may also execute the fourth program instructions after access terminal 416 executes the second program instructions to transition from operating in a non-MIMO reverse-link mode to a MIMO reverse-link mode.

Program instructions 612 may include program instructions that are executable by processor 600 to cause access terminal 416 to operate in the non-MIMO reverse-link mode. For purposes of this description, these program instructions are referred to as the fifth program instructions. Processor 600 may execute the fifth program instructions after access terminal 416 executes the third program instructions to transition from operating in the MIMO reverse-link mode to a non-MIMO reverse-link mode. Access terminal 416 may operate in various non-MIMO reverse-link modes. As an example, access terminal 416 may operate in a non-MIMO reverse-link mode in which transceiver 100 provides reverse-link communications to antenna 102, but does not provide any reverse-link communications to antenna 104. As another example, access terminal 416 may operate in a non-MIMO reverse-link mode in which transceiver 100 provides antenna 104 with reverse-link communications to antenna 104, but does not provide any reverse-link communications to antenna 102.

Program instructions 612 may include program instructions that are executable by processor 600 to configure or re-configure a priority of PER QoS setting 608 to be greater than a priority of RLTR QoS setting 610, and to responsively select, use, or select and use MIMO-A when access terminal 114 operates in a MIMO reverse-link mode. For purposes of this description, these program instructions are referred to as the sixth program instructions.

Program instructions 612 may include program instructions that are executable by processor 600 to configure or re-configure a priority of RLTR QoS setting 610 to be greater than a priority of PER QoS setting 608, and to responsively select, use, or select and use MIMO-B when access terminal 114 operates in a MIMO reverse-link mode. For purposes of this description, these program instructions are referred to as the seventh program instructions.

3. Exemplary Operation

Figure 7:
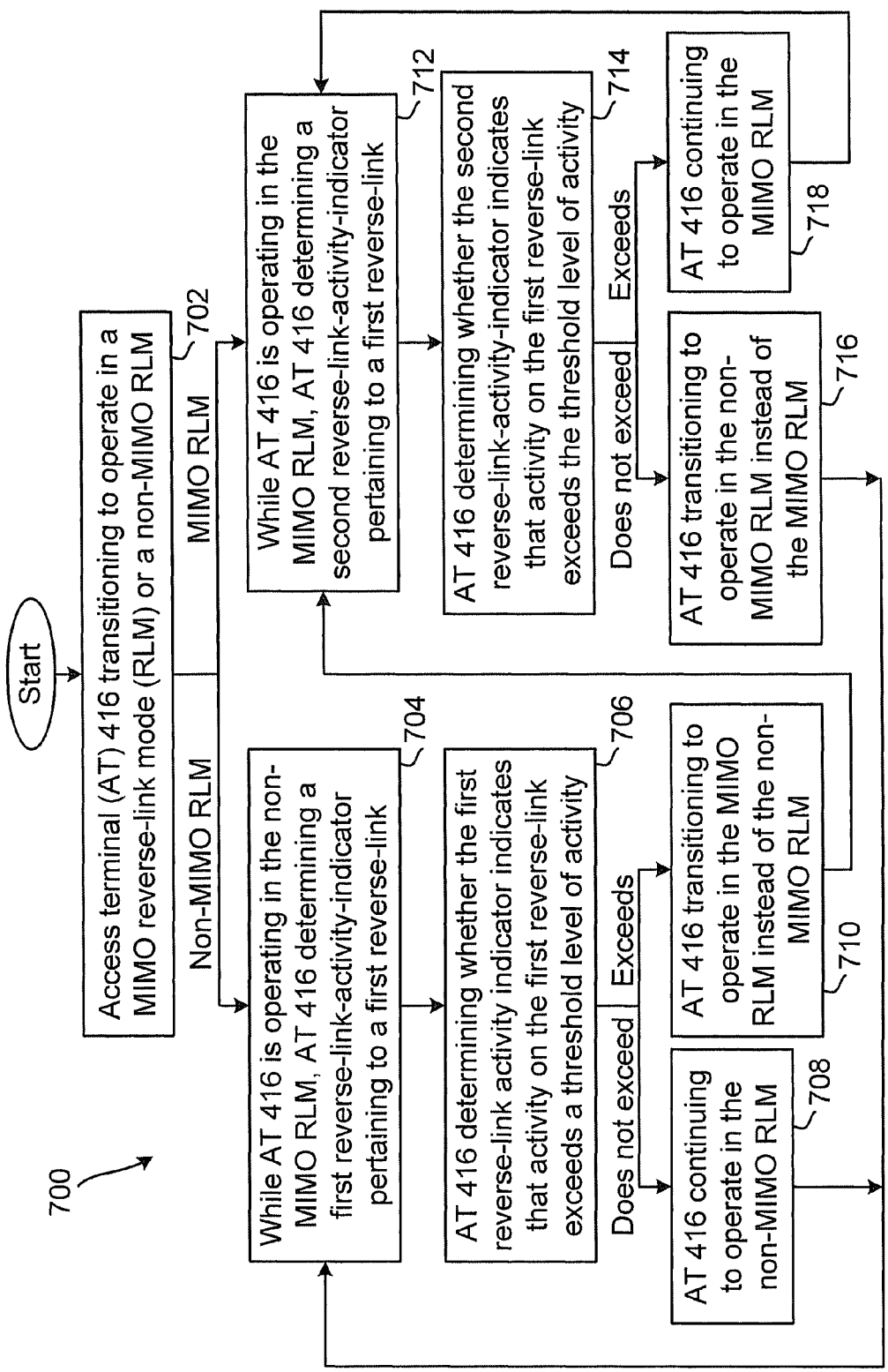
FIG. 7 is a flow chart depicting a set of functions that may be carried out in accordance with an exemplary embodiment.

Next, FIG. 7 is a flow diagram depicting functions of a method 700 that can be carried out in accordance with an exemplary embodiment. Method 700 includes blocks 702 through 718. Blocks 702 through 718 identify access terminal 416 as performing various functions. One or more other access terminals may also perform the functions identified in blocks 702 through 718.

Block 702 includes access terminal 416 transitioning to operate in a MIMO reverse-link mode or a non-MIMO reverse-link mode. The MIMO reverse-link mode may, for example, comprise a MIMO mode in which access terminal 416 transmits, from antennas 102, 104, output signals that have been space-time encoded by access terminal 416 (i.e., MIMO-A), or a MIMO reverse-link mode in which access terminal 416 transmits, from antennas 102, 104, output signals that have been spatially multiplexed by access terminal 416 (i.e., MIMO-B). The non-MIMO reverse-link mode may, for example, comprise a single input multiple output (SIMO) reverse-link mode, as illustrated in FIG. 1.

Access terminal 416 may carry out the transition of block 702 for various reasons. For example, access terminal 416 may transition from (i) a mode in which access terminal 416 does not transmit reverse-link communications to (ii) a non-MIMO reverse-link mode, in response to a user initiating a voice call via access terminal 416. As another example, access terminal 416 may transition to operate in a MIMO reverse-link mode after determining that the reverse-link activity on a reverse-link being used or being monitored by access terminal 416 exceeds a threshold level of activity.

Next, block 704 includes, while access terminal 416 is operating in the non-MIMO reverse-link mode, access terminal 416 determining a first reverse-link-activity indicator pertaining to a first reverse-link. If access terminal 416 is operating in the non-MIMO reverse-link mode via sector 502, then processor 600 may execute the first program instructions to determine a reverse-link-activity indicator pertaining to the reverse-link of sector 502. As another example, if access terminal 416 is operating in the non-MIMO reverse-link mode via sector 502 and access terminal 416 is monitoring the reverse-links of sectors 502, 506, then processor 600 may execute the first program instructions to determine a reverse-link-activity indicator pertaining to the reverse-link of sector 502, sector 506, or sectors 502 and 506.

Next, block 706 includes access terminal 416 determining whether the reverse-link-activity indicator indicates that activity on the reverse-link exceeds a threshold level of activity. Processor 600 may execute the first program instructions to make the determination of block 706. Making the determination of block 706 may include processor 600 comparing the reverse-link-activity indicator (e.g., 0 or 1) determined at block 704 to a data value representing the threshold level of activity (e.g., 0.5). In this case, if the reverse-link-activity indicator determined at block 704 is 1, then the activity on the reverse-link exceeds the threshold level of activity, otherwise, if the reverse-link-activity indicator determined at block 704 is 0, then the activity on the reverse-link does not exceed the threshold level of activity.

If access terminal 416 determines that the reverse activity indicator indicates that activity on the reverse-link does not exceed the threshold level of activity, then method 700 may continue at block 708. Block 708 includes access terminal 416 continuing to operate in the non-MIMO reverse-link mode. Processor 600 may execute the fifth program instructions to continue operating in the non-MIMO reverse-link mode. During performance of block 708, method 700 may continue at block 704.

Returning to block 706, if access terminal 416 determines that the reverse-link-activity indicator indicates that activity on the reverse-link exceeds the threshold level of activity, then method 700 may continue at block 710. Block 710 includes access terminal 416 transitioning to operate in the MIMO reverse-link mode instead of the non-MIMO reverse-link mode. Processor 600 may execute the second program instructions to perform the transition of block 710. After performance of block 710, method 700 may continue at block 712.

Block 712 includes, while access terminal 416 is operating in the MIMO reverse-link mode, access terminal 416 determining a second reverse-link-activity indicator pertaining to the first reverse-link. If access terminal 416 is operating in the MIMO reverse-link mode via sector 502, then processor 600 may execute the first program instructions to determine the second reverse-link-activity indicator pertaining to the reverse-link of sector 502. As another example, if access terminal 416 is operating in the MIMO reverse-link mode via sector 502 and access terminal 416 is monitoring the reverse-links of sectors 502, 506, then processor 600 may execute the first program instructions to determine the second reverse-link-activity indicator pertaining to the reverse-link of sector 502, sector 506, or sectors 502 and 506.

Next, block 714 includes access terminal 416 determining whether the second reverse-link-activity indicator indicates that activity on the first reverse-link exceeds the threshold level of activity. Processor 600 may execute the first program instructions to make the determination of block 714. Making the determination of block 714 may include processor 600 comparing the reverse-link-activity indicator (e.g., 0 or 1) determined at block 712 to a data value representing the threshold level of activity (e.g., 0.5). In this case, if the reverse-link-activity indicator determined at block 712 is 1, then the activity on the reverse-link exceeds the threshold level of activity, otherwise, if the reverse-link-activity indicator determined at block 712 is 0, then the activity on the reverse-link does not exceed the threshold level of activity.

If, at block 714, access terminal 416 determines that the second reverse activity indicator indicates that activity on the first reverse-link does not exceed the threshold level of activity, then method 700 may continue at block 716. Block 716 includes access terminal 416 transitioning to operate in the non-MIMO reverse-link mode instead of the MIMO reverse-link mode. Processor 600 may execute the third program instructions to perform the transition of block 716. After performance of block 716, method 700 may continue at block 704.

Returning to block 714, if access terminal 416 determines that the second reverse-link-activity indicator indicates that activity on the first reverse-link exceeds the threshold level of activity, then method 700 may continue at block 718. Block 718 includes access terminal 416 continuing to operate in the MIMO reverse-link mode. Processor 600 may execute the fourth program instructions to continue operating in the MIMO reverse-link mode. During performance of block 718, method 700 may continue at block 712.

Figure 8:
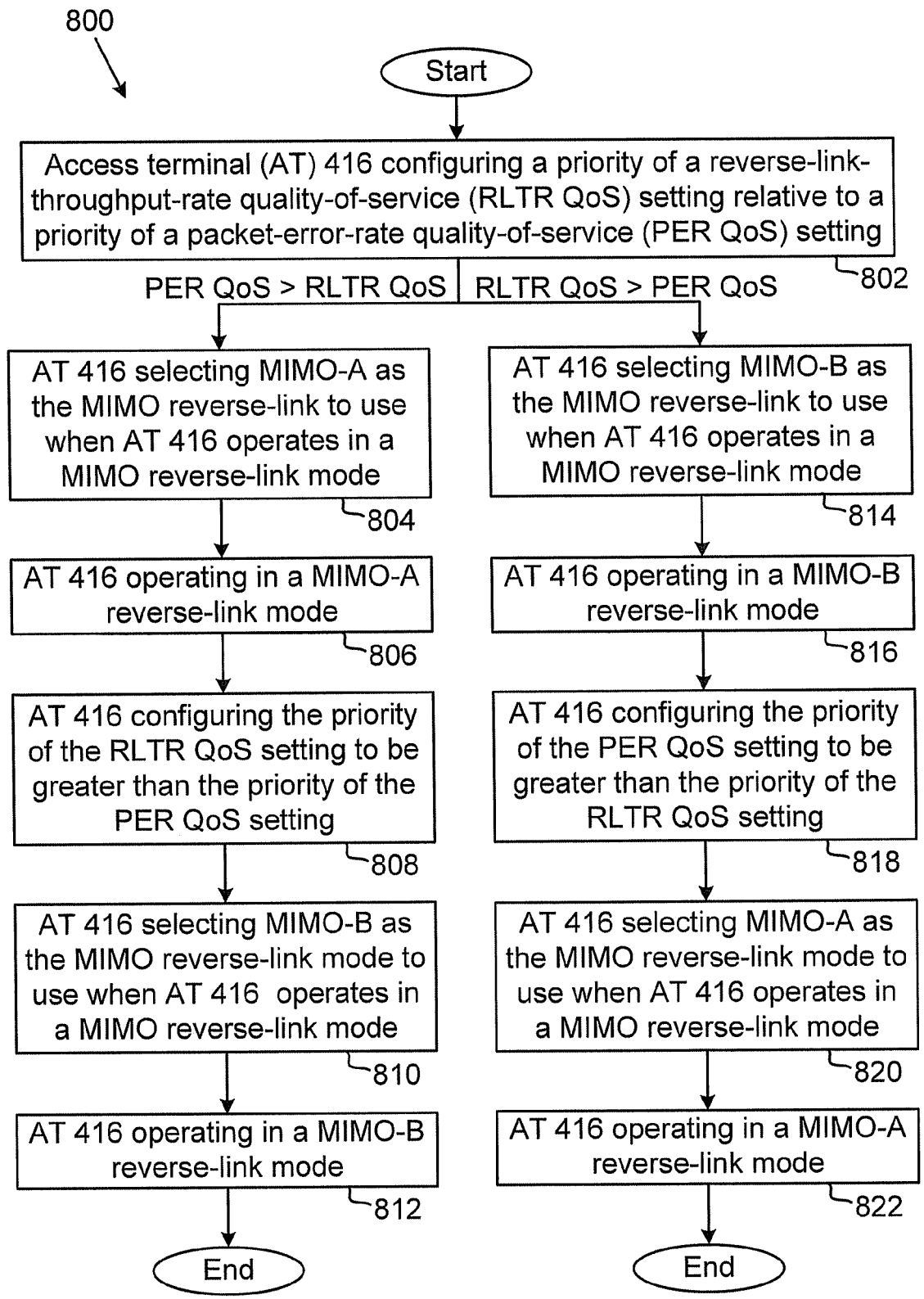
FIG. 8 is a flow chart depicting another set of functions that may be carried out in accordance with an exemplary embodiment.

Next, FIG. 8 is a flow diagram depicting functions of a method 800 that can be carried out in accordance with an exemplary embodiment. Method 800 includes blocks 802 through 822. Blocks 802 through 822 identify access terminal 416 as performing various functions. One or more other access terminals may also perform the functions identified in blocks 802 through 822.

Block 802 includes access terminal 416 configuring a priority of a reverse-link-throughput-rate quality-of-service setting (e.g., RLTR QoS setting 610) relative to a packet-error-rate quality-of-service setting (e.g., PER QoS setting 608). Access terminal 416 may perform this configuration for various reasons. For example, a wireless service provider may cause access terminal 416 to enter a programming mode to perform the configuration of block 802 in response to the wireless service provider and the user of access terminal 416 establishing a service level agreement between them. As another example, access terminal 416 may perform the configuration of block 802 in response to a given event, such as the user of access terminal 416 selecting an application to initiate placement of a voice call via access terminal 416.

At block 802, if the priority of the PER QoS setting is configured to be greater than a priority of the RLTR QoS setting, then method 800 continues at block 804. Bock 804 includes access terminal 416 selecting MIMO-A as the MIMO reverse-link mode to use when access terminal 416 operates in a MIMO reverse-link mode. The selection at block 804 may occur prior to initiation or during initiation of the first occurrence of access terminal 416 operating in a MIMO reverse-link mode after access terminal 416 performs the configuration of block 802.

Next, block 806 includes access terminal 416 operating in a MIMO-A reverse-link mode. Access terminal 416 may, for example, operate in the MIMO-A reverse-link mode while access terminal 416 is being used to perform a voice call. Processor 600 may execute the fourth program instructions to cause access terminal 416 to operate in the MIMO-A reverse-link mode.

Next, block 808 includes access terminal 416 configuring the priority of the RLTR QoS setting to be greater than the priority of the PER QoS setting. Access terminal 416 may perform the configuration of block 808 for various reasons. For example, a wireless service provider may cause access terminal 416 to enter a programming mode to perform the configuration of block 808 in response to the wireless service provider and the user of access terminal 416 modifying a service level agreement between them. As another example, access terminal 416 may perform the configuration of block 808 in response to a given event, such as the user of access terminal 416 starting a browser application for browsing the World Wide Web via access terminal 416.

Next, block 810 includes access terminal 416 selecting MIMO-B as the MIMO reverse-link mode to use when access terminal 416 operates in a MIMO reverse-link mode. The selection at block 810 may occur prior to initiation or during initiation of the first occurrence of access terminal 416 operating in a MIMO reverse-link mode after access terminal 416 performs the configuration of block 808.

Next, block 812 includes access terminal 416 operating in a MIMO-B reverse-link mode. Access terminal 416 may, for example, operate in the MIMO-B reverse-link mode while access terminal 416 is being used browse the World Wide Web. Processor 600 may execute the fourth program instructions to cause access terminal 416 to operate in the MIMO-B reverse-link mode.

Returning to block 802, if the priority of the RLTR QoS setting is configured to be greater than the priority of the PER QoS setting, then method 800 continues at block 814. Block 814 includes access terminal 416 selecting MIMO-B as the MIMO reverse-link mode to use when access terminal 416 operates in a MIMO reverse-link mode. The selection at block 814 may occur prior to initiation or during initiation of the first occurrence of access terminal 416 operating in a MIMO reverse-link mode after access terminal 416 carries out the configuration of block 802.

Next, block 816 includes access terminal 416 operating in a MIMO-B reverse-link mode. Access terminal 416 may, for example, operate in the MIMO-B reverse-link mode while access terminal 416 is being used browse the World Wide Web. Processor 600 may execute the fourth program instructions to cause access terminal 416 to operate in the MIMO-B reverse-link mode.

Next, block 818 includes access terminal 416 configuring the priority of the PER QoS setting to be greater than the priority of the RLTR QoS setting. Access terminal 416 may perform the configuration of block 818 for various reasons. For example, a wireless service provider may cause access terminal 416 to enter a programming mode to perform the configuration of block 818 in response to the wireless service provider and the user of access terminal 416 modifying a service level agreement between them. As another example, access terminal 416 may perform the configuration of block 818 in response to a given event, such as the user of access terminal 416 starting an application for carrying out a voice call via access terminal 416.

Next, block 820 includes access terminal 416 selecting MIMO-A as the MIMO reverse-link mode to use when access terminal 416 operates in a MIMO reverse-link mode. The selection at block 820 may occur prior to initiation or during initiation of the first occurrence of access terminal 416 operating in a MIMO reverse-link mode after access terminal 416 performs the configuration of block 818.

Next, block 822 includes access terminal 416 operating in a MIMO-A reverse-link mode. Access terminal 416 may, for example, operate in the MIMO-A reverse-link mode while access terminal 416 is being used to perform a voice call. Processor 600 may execute the fourth program instructions to cause access terminal 416 to operate in the MIMO-A reverse-link mode.

4. Conclusion

Exemplary embodiments of the present invention have been described above. The exemplary embodiments may be used by an access terminal to maintain a given reverse-link throughput rate even through a radio node has signaled the access terminal to reduce its reverse-link throughput rate from the given rate. The exemplary embodiments may also be used to increase the reliability of data being transmitted via a reverse-link during poor reverse-link conditions.

Those skilled in the art will understand that changes and modifications may be made to the described embodiments without departing from the true scope and spirit of the present invention, which is defined by the claims.

We claim:

1. At an access terminal operable in a multiple input multiple output (MIMO) reverse-link mode and in a non-MIMO reverse-link mode, a method comprising:
   determining, by the access terminal while the access terminal operates in the non-MIMO reverse-link mode instead of the MIMO reverse-link mode, (i) a first reverse-link-activity indicator that indicates an activity level occurring on a first reverse-link monitored by the access terminal, and (ii) a first determination indicating the activity level on the first reverse-link exceeds a threshold level of activity or indicating the activity level on the first reverse-link does not exceed the threshold level of activity, wherein the access terminal is operable to transmit reverse-link communications via the first reverse-link and to receive forward-link communications via a forward-link;
   continuing, by the access terminal, operation of the access terminal in the non-MIMO reverse-link mode instead of the MIMO reverse-link mode if the first determination indicates the activity level on the first reverse-link does not exceed the threshold level of activity; and
   transitioning, by the access terminal, operation of the access terminal from the non-MIMO reverse-link mode instead of the MIMO reverse-link mode to the MIMO reverse-link mode instead of the non-MIMO reverse-link mode if the first determination indicates the activity level on the first reverse-link exceeds the threshold level of activity.

2. The method of claim 1, further comprising:
   while the access terminal is operating in the MIMO reverse-link mode, the access terminal determining a second reverse-link-activity indicator pertaining to the first reverse-link, and determining whether the second reverse-link-activity indicator indicates that activity on the first reverse-link exceeds the threshold level of activity;
   if the access terminal determines that the second reverse-link-activity indicator indicates that activity on the first reverse-link exceeds the threshold level of activity, then the access terminal continues to operate in the MIMO reverse-link mode, and
   if the access terminal determines that the second reverse-link-activity indicator indicates that activity on the first reverse-link does not exceed the threshold level of activity, then the access terminal transitions to operate in the non-MIMO reverse-link mode instead of the MIMO reverse-link mode.

3. The method of claim 2, further comprising:
   prior to the access terminal determining the first reverse-link-activity indicator, the access terminal receiving a first plurality of reverse activity bits via a forward-link of an access network; and
   prior to the access terminal determining the second reverse-link-activity indicator, the access terminal receiving a second plurality of reverse activity bits via the forward-link of the access network,
   wherein the first reverse-link-activity indicator is determined from the first plurality of reverse activity bits, and
   wherein the second reverse-link-activity indicator is determined from the second plurality of reverse activity bits.

4. The method of claim 1, wherein output signals transmitted from the access terminal while the access terminal operates in the MIMO reverse-link mode comprise signals that have been space-time encoded by the access terminal.

5. The method of claim 4, further comprising:
   prior to the access terminal determining the first reverse-link-activity indicator, the access terminal configuring a priority of a Quality of Service (QoS) setting for a packet error rate to be greater than a priority of a QoS setting for a reverse-link throughput rate.

6. The method of claim 1, wherein output signals transmitted from the access terminal while the access terminal operates in the MIMO reverse-link mode comprise signals that have been spatially multiplexed by the access terminal.

7. The method of claim 6, further comprising:
   prior to the access terminal determining the first reverse-link-activity indicator, the access terminal configuring a priority of a Quality of Service (QoS) setting for a reverse-link throughput rate to be greater than a priority of a QoS setting for a packet error rate.

8. The method of claim 7, further comprising:
   after the access terminal determines the first reverse-link-activity indicator and continues to operate in the non-MIMO reverse-link mode or transitions to operate in the MIMO reverse-link mode, the access terminal configuring the priority of the QoS setting for the packet error rate to be greater than the priority of the QoS setting for the reverse-link throughput rate,
   wherein, after the access terminal configures the priority of the QoS setting for the packet error rate to be greater than the priority of the QoS setting for the reverse-link throughput rate and while the access terminal operates in the MIMO reverse-link mode, output signals transmitted from the access terminal comprise signals that are space-time encoded by the access terminal.

9. The method of claim 1, wherein the first reverse-link-activity indicator is a reverse activity bit sent to the access terminal via a forward-link channel from a radio node controlled by a radio node controller.

10. An access terminal that is operable in a multiple input multiple output (MIMO) reverse-link mode and in a non-MIMO reverse-link mode, the access terminal comprising:
- a processor within the access terminal, wherein the access terminal is operable to transmit reverse-link communications via a first reverse-link and to receive forward-link communications via a forward-link; and
- a data storage device that contains first computer-readable program instructions and second computer-readable program instructions that are executable by the processor,
- wherein execution of the first program instructions causes the processor to determine reverse-link-activity indicators that indicate activity levels occurring on the first reverse-link monitored by the access terminal, and to determine whether the reverse-link-activity indicators indicate the activity levels on the first reverse-link exceeds a threshold level of activity or indicate the activity levels on the first reverse-link do not exceed the threshold level of activity,
- wherein, while the access terminal operates in the non-MIMO mode instead of the MIMO reverse-link mode, if the processor executes the first program instructions and determines that a first reverse-link-activity indicator indicates that an activity level occurring on the first reverse-link does not exceed the threshold level of activity, then the access terminal continues to operate in the non-MIMO reverse-link mode instead of the MIMO reverse-link mode,
- wherein, while the access terminal operates in the non-MIMO mode instead of the MIMO reverse-link mode, if the processor executes the first program instructions and determines that the first reverse-link-activity indicator indicates that the activity level on the first reverse-link monitored by the access terminal exceeds the threshold level of activity, then the processor executes the second program instructions, and
- wherein execution of the second program instructions causes the access terminal to transition from operating in the non-MIMO reverse-link mode to the MIMO reverse-link mode.

11. The access terminal of claim 10,
- wherein the data storage device contains third computer-readable program instructions that are executable by the processor,
- wherein, while the access terminal operates in the MIMO reverse-link mode instead of the non-MIMO reverse-link mode, if the processor executes the first program instructions and determines that a second reverse-link-activity indicator indicates that an activity level on the first reverse-link exceeds the threshold level of activity, then the access terminal continues to operate in the MIMO reverse-link mode instead of the non-MIMO reverse-link mode,
- wherein, while the access terminal operates in the MIMO reverse-link mode, if the processor executes the first program instructions and determines that the second reverse-link-activity indicator indicates that the activity level on the first reverse-link does not exceed the threshold level of activity, then the processor executes the third program instructions, and
- wherein execution of the third program instructions causes the access terminal to transition from the MIMO reverse-link mode to the non-MIMO reverse-link mode.

12. The access terminal of claim 10, further comprising:
a transceiver,
- wherein the MIMO reverse-link mode is a first MIMO reverse-link mode, and
- wherein, while the access terminal operates in the first MIMO reverse-link mode, the transceiver transmits output signals that have been space-time encoded by the access terminal.

13. The access terminal of claim 12,
- wherein the data storage device contains computer-readable program instructions that are executable by the processor to (i) configure a priority of a packet-error-rate quality-of-service (PER QoS) setting to be greater than a priority of a reverse-link-throughput-rate quality-of-service (RLTR QoS) setting, and (ii) responsively select the first MIMO reverse-link mode as the MIMO reverse-link mode.

14. The access terminal of claim 10, further comprising:
a transceiver,
- wherein the MIMO reverse-link mode is a first MIMO reverse-link mode, and
- wherein while the access terminal operates in the first MIMO reverse-link mode, the transceiver transmits output signals that have been spatially multiplexed by the access terminal.

15. The access terminal of claim 14,
- wherein the data storage device contains computer-readable program instructions that are executable by the processor to (i) configure a priority of a reverse-link-throughput-rate quality-of-service (RLTR QoS) setting to be greater than a priority of a packet-error-rate quality-of-service (PER QoS) setting, and (ii) responsively select the first MIMO reverse-link mode as the MIMO reverse-link mode.

16. The access terminal of claim 15,
- wherein the data storage device contains computer-readable program instructions that are executable by the processor to (i) re-configure the priority of the PER QoS setting to be greater than the priority of the RLTR QoS setting, and (ii) responsively select a second MIMO reverse-link mode as the MIMO reverse-link mode, and
- wherein while the access terminal operates in the second MIMO reverse-link mode, the transceiver transmits output signals that have been space-time encoded by the access terminal.

17. The access terminal of claim 10, wherein the non-MIMO reverse-link mode is selected from the group consisting of: (i) a single input single output reverse-link mode, and (ii) a multiple input single output reverse-link mode.

18. At an access terminal operable in a multiple input multiple output (MIMO) reverse-link mode and in a non-MIMO reverse-link mode, a method comprising:
- determining, by the access terminal while the access terminal operates in the non-MIMO reverse-link mode via a first reverse-link instead of the MIMO reverse-link mode, (i) a reverse-link-activity indicator that indicates an activity level occurring on a second reverse-link that is monitored by the access terminal, and (ii) a first determination indicating the activity level on the second reverse-link exceeds a threshold level of activity or indicating the activity level on the second reverse-link does not exceed the threshold level of activity, wherein the access terminal is operable to transmit reverse-link communications via the first reverse-link and to receive forward-link communications via a forward-link;
- continuing, by the access terminal, operation of the access terminal in the non-MIMO reverse-link mode via the first reverse-link instead of the MIMO reverse-link mode if the first determination indicates the activity level on the second reverse-link does not exceed the threshold level of activity; and transitioning, by the access terminal, operation of the access terminal from the non-MIMO reverse-link mode via the first reverse-link instead of the MIMO reverse-link mode to the MIMO reverse-link mode via the first reverse-link instead of the non-MIMO reverse-link mode on the first reverse-link if the first determination indicates the activity level on the second reverse-link exceeds the threshold level of activity.

19. The method of claim 18, further comprising:

determining, by the access terminal while the access terminal operates in the MIMO reverse-link mode via the first reverse-link, (i) a reverse-link-activity indicator that indicates an activity level occurring on the first reverse-link, and (ii) a second determination indicating the activity level on the first reverse-link exceeds the threshold level of activity or indicating the activity level on the first reverse-link does not exceed the threshold level of activity;

continuing, by the access terminal, operation of the access terminal in the MIMO reverse-link mode via the first reverse-link if the second determination indicates the activity level on the first reverse-link exceeds the threshold level of activity, and transitioning, by the access terminal, operation of the access terminal from the MIMO reverse-link mode on the first reverse-link to the non-MIMO reverse-link mode on the first reverse-link if the second determination indicates the activity level on the first reverse-link does not exceed the threshold level of activity.

20. The method of claim 19, wherein the access terminal determining the reverse-link-activity indicator that indicates the activity level occurring on the second reverse-link includes the access terminal receiving a plurality of reverse activity bits transmitted via a forward-link associated with the second reverse-link, and the access terminal determining an average of the plurality of reverse activity bits transmitted via the forward-link associated with the second reverse-link, and wherein the access terminal determining the reverse-link-activity indicator that indicates the activity level occurring on the first reverse-link includes the access terminal receiving a plurality of reverse activity bits transmitted via a forward-link associated with the first reverse-link, and the access terminal determining an average of the plurality of reverse activity bits transmitted via the forward-link associated with the first reverse-link.

* * * * *